United States Patent [19]

Gizzio

[11] Patent Number: 4,484,805
[45] Date of Patent: Nov. 27, 1984

[54] PHOTO SPLITTING DEVICE

[76] Inventor: John Gizzio, 761 Sproul Rd., Springfield, Pa. 19064

[21] Appl. No.: 504,669

[22] Filed: Jun. 15, 1983

[51] Int. Cl.³ .............................................. G03B 11/00
[52] U.S. Cl. ..................................... 354/122; 354/295
[58] Field of Search ........................ 354/122, 295, 296

[56] References Cited

U.S. PATENT DOCUMENTS

| 3,940,775 | 2/1976 | Bodnar | 354/122 |
| 4,122,470 | 10/1978 | Loranger et al. | 354/295 |
| 4,291,962 | 9/1981 | Jackson | 354/122 |

*Primary Examiner*—A. A. Mathews
*Attorney, Agent, or Firm*—Eugene E. Renz, Jr.

[57] ABSTRACT

A device for mounting over the lens of a camera to enable two exposures to be made on film normally available for a single exposure. The device includes a ring section mountable over the lens which merges with a section having an outer terminal end divided into two angularly disposed planes normal to the horizontal centerline of the device and forming upper and lower flange portions. The outermost apex of the flange portions mounts a light-blocking plate adapted for movement from one side of the angularly disposed planes to the other and plate handles which interlock with the flange portions to retain them in place in one position or another and a sighting line on the upper and lower faces of the device.

8 Claims, 9 Drawing Figures

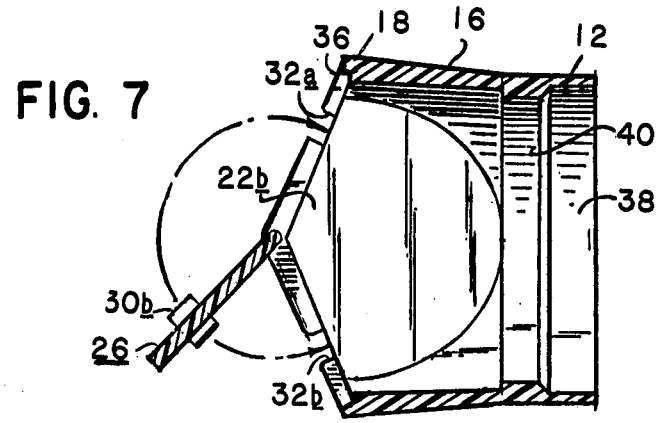
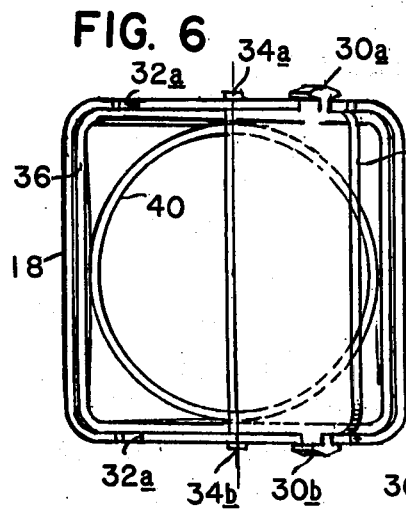
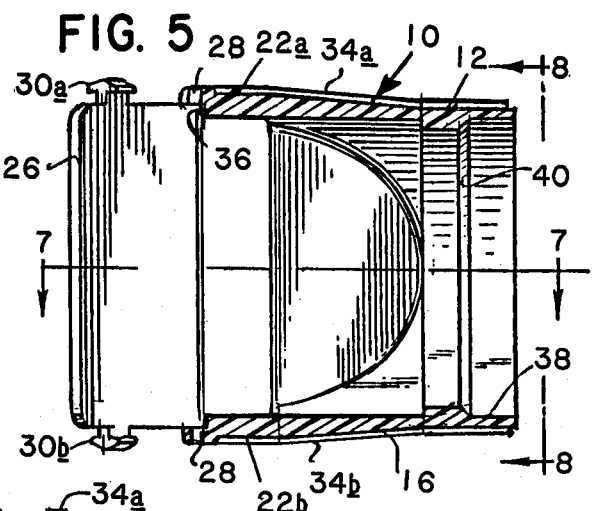
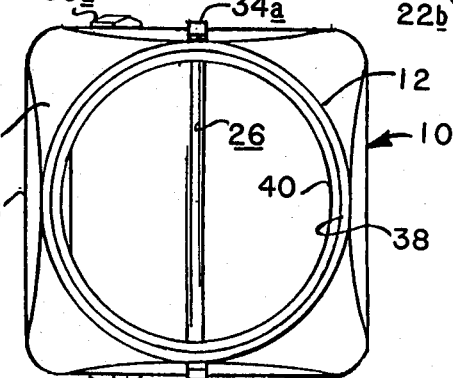
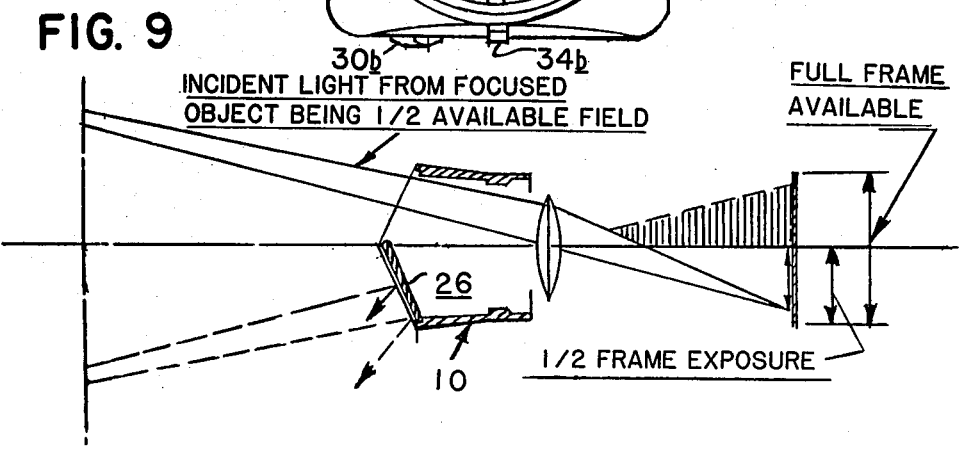

PHOTO SPLITTING DEVICE

BACKGROUND OF THE INVENTION

This invention relates to a novel photo splitting device which enables two separate, side-by-side exposures to be made on a single frame of film behind the lens of a camera.

Cameras such as Polaroid ® instant cameras are well known and are used for numerous business and pleasure purposes. Normally the cost of the film for such cameras is not a factor since the convenience and pleasure of an immediate picture makes such cost worthwhile. However, in certain applications where large numbers of exposures are made, film cost becomes relatively high and it is desirable that means be found to reduce such costs. Thus, for example, adjusters and physical damage appraisers for insurance companies take thousands of exposures daily of automobile accidents which must be kept in file records. The film cost for such pictures becomes significant over a year's time and it is desired that means be found to reduce film costs for instant cameras as such cameras are particularly useful for insurance claims adjusters and appraisers. This invention provides means to halve such film costs as it enables two pictures to be obtained on a single frame of film in the camera behind the lens.

Devices for accomplishing this result have been available heretofore but have lacked the advantages and efficiency of the device of this invention. For example, a device is known comprising a cylindrical section frictionally mounted over the camera lens mounting, which cylindrical section contains a light-blocking segment for one-half of the lens which is rotatably mounted within the cylindrical sections. By rotating the light-blocking segment 180°, either half of the lens may be blocked and two exposures made of the single frame of film behind the lens. Such a device is not very satisfactory, however, as vignetting occurs which results in obtaining less than a full picture as seen in the viewfinder. Also, in rotating the light-blocking section, the cylindrical section mounted on the camera lens mounting may inadvertently be moved which destroys the symmetry of the two exposures.

The device of the present invention eliminates the vignetting and movement problems and also provides several additional advantages as will become apparent from the description which follows. In particular, the device of the invention provides for easy operation, guides the operator of the camera as to which side of the lens is closed off, and provides a sighting line that divides the subject so the picture to be taken may be aligned within the viewfinder without loss of subject matter when the exposure is made. The device may also be adapted to fit more than one model of camera and, in addition, it may serve as a sun shade when not in use as a photo splitter.

BRIEF STATEMENT OF THE INVENTION

The invention is a device adapted to fit over the lens mounting ring of a camera and enable two exposures to be made in film normally meant for a single exposure. The device comprises a ring section (12) designed to frictionally fit over the lens mounting ring of a camera, the ring section merging with a generally rectangular section (18) having an outer terminal end divided into two angularly disposed planes (20a and 20b) normal to the horizontal centerline of the device, forming upper and lower triangular shaped flange portions (22a and 22b). Holes (24a and 24b) are provided at the outermost apex of the triangularly shaped flange portions for pivotally mounting a light blocking plate (26) by means of pins (28) on the plate. Plate handles (30a and 30b) are provided on the plate which interlock with recesses (32a and 32b) on the upper and lower angularly disposed planes (20a and 20b) of the upper and lower triangularly shaped flange portion (22a and 22b), and a sighting line (34a) is integrally molded on the upper and lower faces of the device.

BRIEF DESCRIPTION OF THE DRAWINGS

FIG. 5 is an enlarged sectional side view of the device taken on line 5—5 of FIG. 4.

FIG. 6 is a front elevational view of the device shown in FIG. 5.

FIG. 7 is a sectional plan view of the device taken on line 7—7 of FIG. 5.

FIG. 8 is a rear elevational view of the device taken in line 8—8 of FIG. 5.

FIG. 9 is a schematic view showing the principle of operation of the device.

DETAILED DESCRIPTION OF THE INVENTION

Figure 1:
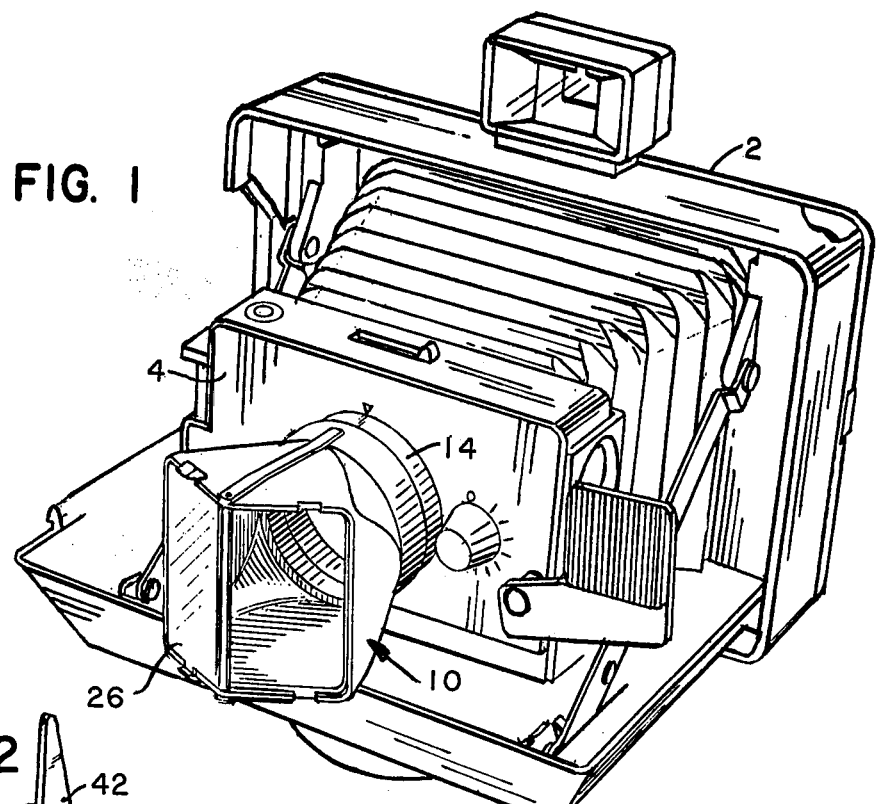
FIG. 1 is a perspective view showing a Polaroid ® type camera with the device of the invention mounted on the lens mounting ring of the camera.

Referring now to FIG. 1, a Polaroid ® type camera (2) shown generally in perspective view has a basic construction illustrated in phantom line with the exception of the objective lens mounting plate (4). On the outer terminal end of the objective lens mounting ring (14) of the camera, the device of the invention (10) is mounted by frictional engagement. A light blocking plate (26) is shown in a position so that only the right side of the camera lens (facing the camera) will permit light to pass through to the film.

Figure 2:
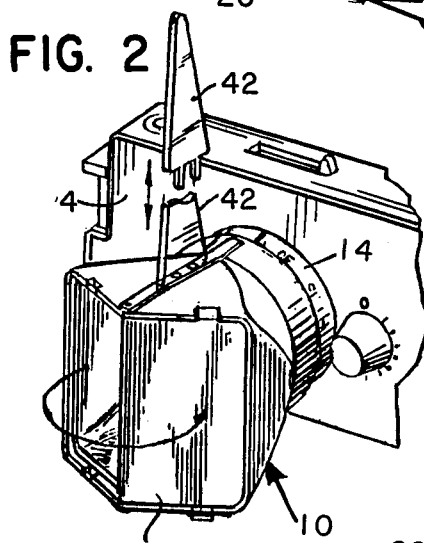
FIG. 2 is a fragmentary perspective view of the device shown in FIG. 1 with an optional sighting fin.

FIG. 2 shows in fragmentary perspective view how the light blocking plate (26) swings to its alternative position to block light from reaching the left side of the lens. Also shown here is an optional, removable sighting and divider fin (42) described later in further detail.

Figure 3:
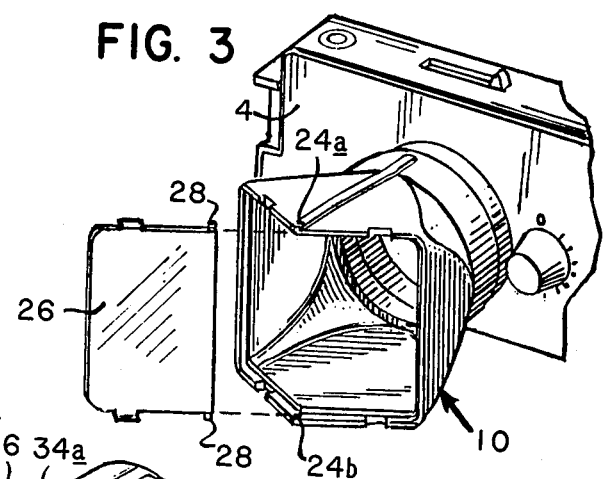
FIG. 3 is a fragmentary perspective view similar to FIG. 2 with the device of the invention converted to a light shield.

Referring now to FIG. 3 which is a fragmentary perspective view similar to FIG. 2, it is seen how the light blocking plate (26) may be removed whereby the device becomes a light shield for the camera lens. Removal of the plate (26) simply requires that the hinge pins (28) be forcibly removed from their mounting holes (24a and 24b).

Figure 4:
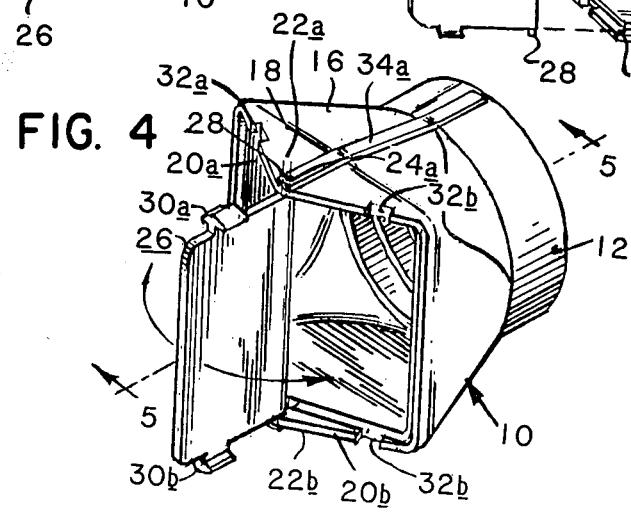
FIG. 4 is an enlarged perspective view of the invention when removed from the camera.

FIG. 4 shows the device in greater detail. The photo splitter device of the invention is shown generally as (10) and has at its inner terminal end a ring (12) that is designed to frictionally fit over the objective lens mounting ring (14) of the camera. The ring (12) merges with a generally truncated conical transition portion (16), which, in turn merges into a generally rectangular portion (18) whose outer terminal end is divided equally into two angularly disposed planes or faces (20a and 20b) which are normal to the horizontal center line of the device and which form upper and lower triangularly shaped flange portions (22a and 22b). These flange members have means for mounting plate 26 such as small holes (24a and 24b) at their outermost apex for pivotally mounting the light blocking plate 26 by means of small pin shafts 28 carried on the ends of the light blocking plate (26) (see FIG. 3). Adjacent the free end of the light blocking plate (26) (i.e. the end opposite the mounting pin shafts (28) are small ribs or handles (30a and 30b) which interlock in a light tight manner with corresponding recesses (32a and 32b) located in the upper and lower angularly disposed faces (20a and 20b). It should be noted that the light blocking plate fits into the angularly disposed planes or faces (20a and 20b) in a light tight manner.

The photo splitting device of the invention also has sighting or divider ribs (34a, the bottom rib 34b seen being at FIG. 5). These sighting ribs are integrally molded on the upper and lower faces axially extending from the ring area (12) to the apex of the triangular shaped flange portions and are thus aligned with the pivot point of the light blocking plate (26). These ribs are preferably colored white and, as explained above, enable the camera operator to correctly view each half of the exposure to be taken in order to obtain the desired content and alignment of the finished picture. As indicated in FIG. 2 an optional sighting and divider fin (42) may be used on the device. This fin (42) is of a generally triangular shape having means to be removably attached to the sighting rib. A preferred means of attachment to the rib will be a plurality (preferably two) of integrally molded pin-like extensions at the base of the triangle which extensions frictionally fit into hooks on the rib. This fin (42) which is preferably white, is readiy seen through the viewfinder of the camera. The fin (42) functions in combination with the viewfinder of the camera and the light blocking plate (26) to enable perfect alignment to be achieved so that two pictures on a single frame of film are obtained without a divider line showing on the finished photos.

Referring now to FIGS. 5, 6, 7 and 8, additional details of the device are seen. In FIGS. 5 and 6, the circumferentially extending shoulder (36) provides a light-tight seal for light blocking plate (26) when it is latched by means of the handles (30a and 30b) being positioned in the recesses (32a and 32b) adapted to receive the handles.

FIGS. 5 and 8 show the lens mounting ring stop (40) associated with the ring sections (38) adapted to fit over the lens mounting ring. Although not shown, it will be understood that multiple lens mounting ring stops of various diameters may be used within the ring mounting sections so that the device may be used with various camera models having varying sized lens mounting rings; e.g. with the Polaroid "reporter" and "E-100 special".

FIG. 9 shows in detail the principle of operation of the device which involves blocking out the light from one side of the lens to expose only one half of the full frame of film available. The unused half-frame of film is then exposed separately after moving the light blocking plate to the other side.

The device of the invention is readily made from metal or plastic material and is preferably molded from a plastic such as urea-formaldehyde/resin, polystyrene, polyethylene, polypropylene, polycarbonate, and the like. Generally, the device is made black in color except for the white sighting ribs and divided fin as discussed above. The device is economical to make, convenient to carry and easy to use. Although the above description is described to use of the device on an instant camera, it will be understood that it may be used on all types of cameras where applicable; e.g. where the camera has a lens-mounting ring extending on the outside of the body of the camera.

As pointed out above, one advantage of the device of this invention is that it enables two exposures to be made on a single frame of film without vignetting. This advantage is obtained due to the triangularly-shaped flange portions (22a or 22b) in combination with the two angularly disposed planes (22a or 22b). The flange portion extends the light-blocking plate away from the lens and with the angularly disposed plane not covered by the plate, sufficient light reaches one-half of the lens to give a satisfactory picture without vignetting; i.e., without cutting off light normally reaching the corners of the picture frame.

It is evident from the above description of the invention that it makes a valuable and significant contribution to the art.

I claim:

1. A device adapted to fit over the lens mounting ring of a camera and enable two exposures to be made on film normally available for a single exposure, said device comprising a ring section (12) designed to fit over the lens mounting ring of a camera, said ring section merging with a section (18) having an outer terminal end divided into two angularly disposed planes (20a and 20b) normal to the horizontal centerline of the device forming upper and lower flange portions (22a and 22b), means in the outermost apex of said flange portions for mounting a light-blocking plate adapted to move from one side of said angularly disposed planes to the other, plate handles (30a and 30b) on said plate which interlock with recesses (32a and 32b) on the upper and lower portions of said lower flange portions (22a and 22b) and a sighting line (34a) on the upper and lower faces of the device.

2. The device of claim 1 wherein said ring section is adapted by means of multiple lens mounting ring stops to fit more than a single model of camera.

3. A device adapted to fit over the lens mounting ring of a camera and enable two exposures to be made on film normally available for a single exposure, said device comprising a ring section (12) designed to frictionally fit over the lens mounting ring of a camera, said ring section merging with a generally rectangular section (18) having an outer terminal end divided into two angularly disposed planes (20a and 20b) normal to the horizontal centerline of the device forming upper and lower triangularly-shaped flange portions (22a and 22b) holes 24a and 24b) in the outermost apex of said triangularly-shaped flange portions for mounting a light-blocking plate (26) by means of pins (28) on said plate, plate handles (30a and 30b) on said plate which interlock with recesses (32a and 32b) on the upper and lower angularly displaced planes (20a and 20b) of the upper and lower triangularly-shaped flange portions (22a and 22b) whereby said light blocking plate and said handles fit against said flange portions in a light-tight manner, and a sighting line (34a) integrally molded on the upper and lower faces of the device.

4. The device of claim 3 wherein said ring section contains multiple lens mounting ring stops to make the device adaptable for use on more than a single model of camera.

5. The device of claim 1 having a divider fin (42) removably mounted on said sighting line.

6. The device of claim 4 having a divider fin (42) removably mounted on said sighting line.

7. In combination, a camera having a lens mounting ring extending on the outside of the body of said camera and a device mounted over said lens mounting ring to enable two exposures to be made on film normally available for a single exposure, said device comprising a ring section designed to frictionally fit over said lens mounting ring, said ring section merging with a generally rectangular section having an outer terminal end divided into two angularly disposed planes normal to the horizontal centerline of the device forming upper and lower triangularly-shaped flange portions, means in the outermost apex of said triangularly-shaped flange portions for mounting a light-blocking plate adapted to move from one side of said angularly disposed planes to the other, plate handles on said plate which interlock with recesses on the upper and lower portions of said lower triangularly-shaped flange portions whereby said light-blocking plate and said handles fit against said flange portions in a light-tight manner, and a sighting line (34a) integrally molded on the upper and lower faces of the device.

8. The combination of claim 7 having a dividing fin removably mounted on said sighting line.

* * * * *